US010823004B2

(12) United States Patent
Kallianteris et al.

(10) Patent No.: US 10,823,004 B2
(45) Date of Patent: Nov. 3, 2020

(54) GEARED TURBOFAN ENGINE AND SPLINE ARRANGEMENT

(71) Applicant: Rolls-Royce Deutschland Ltd & Co KG, Blankenfelde-Mahlow (DE)

(72) Inventors: Christos Kallianteris, Berlin (DE); Andreas Becker, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 90 days.

(21) Appl. No.: 16/355,048

(22) Filed: Mar. 15, 2019

(65) Prior Publication Data
US 2019/0292942 A1 Sep. 26, 2019

(30) Foreign Application Priority Data

Mar. 20, 2018 (DE) .................. 10 2018 106 484

(51) Int. Cl.
*F01D 25/18* (2006.01)
*F01D 25/16* (2006.01)
(Continued)

(52) U.S. Cl.
CPC ........... *F01D 25/183* (2013.01); *F01D 25/16* (2013.01); *F02C 3/06* (2013.01); *F02C 7/36* (2013.01);
(Continued)

(58) Field of Classification Search
CPC .......... F01D 25/16; F01D 25/183; F02C 7/28; F02C 7/36; F02C 3/06; F16J 15/54;
(Continued)

(56) References Cited

U.S. PATENT DOCUMENTS 8,747,055 B2 * 6/2014 McCune ................... F02C 7/20
  415/122.1
8,899,915 B2 * 12/2014 McCune ................... F02C 7/36
  415/122.1
(Continued)

FOREIGN PATENT DOCUMENTS

| DE | 102016204070 A1 | 9/2016 |
| EP | 0587153 A2 | 3/1994 |
| JP | 2017166703 A | 9/2017 |

OTHER PUBLICATIONS

German Search Report dated Oct. 29, 2018 for counterpart German Patent Application No. 10 2018 106 484.5.

*Primary Examiner* — Igor Kershteyn
(74) *Attorney, Agent, or Firm* — Shuttleworth & Ingersoll, PLC; Timothy Klima

(57) ABSTRACT

A geared turbofan engine that has a planetary gearbox which couples a fan shaft and a turbine shaft to each other. The planetary gearbox includes a sun gear that is driven by the turbine shaft. The turbine shaft and the sun gear form a spline shaft connection that is lubricated with oil. Sealing means are provided, sealing off the oil in the toothing area of the spline shaft connection. The sealing means have an elastic sealing ring that has a variable diameter and is springing outwards, and that is arranged inside a groove extending in the circumferential direction of the turbine shaft, wherein the sealing ring abuts at an inner circumferential surface of the sun gear with its radially outer circumferential surface. In further aspects, the invention relates to a method for mounting a planetary gearbox on a turbine shaft and to a spline arrangement.

20 Claims, 9 Drawing Sheets

(51) Int. Cl.

| | | |
|---|---|---|
| *F02C 3/06* | (2006.01) | |
| *F02C 7/36* | (2006.01) | |
| *F02K 3/06* | (2006.01) | |
| *F16D 3/06* | (2006.01) | |
| *F16H 1/28* | (2006.01) | |
| *F16H 57/00* | (2012.01) | |
| *F16H 57/04* | (2010.01) | |
| *F16H 57/08* | (2006.01) | |
| *F16J 15/38* | (2006.01) | |

(52) U.S. Cl.
CPC ............... *F02K 3/06* (2013.01); *F16D 3/06* (2013.01); *F16H 1/28* (2013.01); *F16H 57/0025* (2013.01); *F16H 57/0479* (2013.01); *F16H 57/08* (2013.01); *F16J 15/38* (2013.01); *F05D 2240/55* (2013.01); *F05D 2260/40311* (2013.01); *F05D 2260/98* (2013.01); *F16H 2057/085* (2013.01)

(58) Field of Classification Search
CPC .... F16J 15/38; F16J 9/14; F16H 15/54; F16H 1/28; F16H 57/08; F16H 57/0025; F16H 57/0479; F16H 2057/085; F16D 1/101; F16D 3/06; F16D 2300/08; F05D 2240/55; F05D 2260/40311; F05D 2260/98

See application file for complete search history.

(56) References Cited

U.S. PATENT DOCUMENTS

| | | | |
|---|---|---|---|
| 9,631,558 B2* | 4/2017 | McCune | ............... F02C 7/20 |
| 9,752,511 B2* | 9/2017 | McCune | ............... F01D 15/12 |
| 2013/0336791 A1 | 12/2013 | McCune et al. | |
| 2016/0273592 A1 | 9/2016 | Akita et al. | |

* cited by examiner

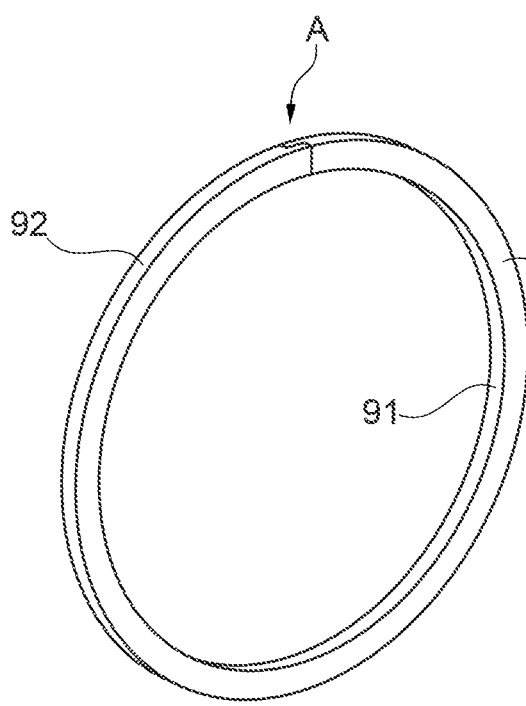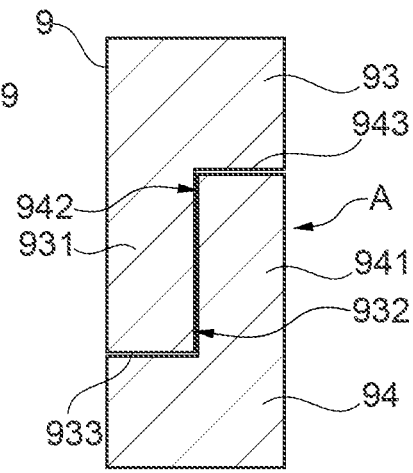
Fig. 5a    Fig. 5b
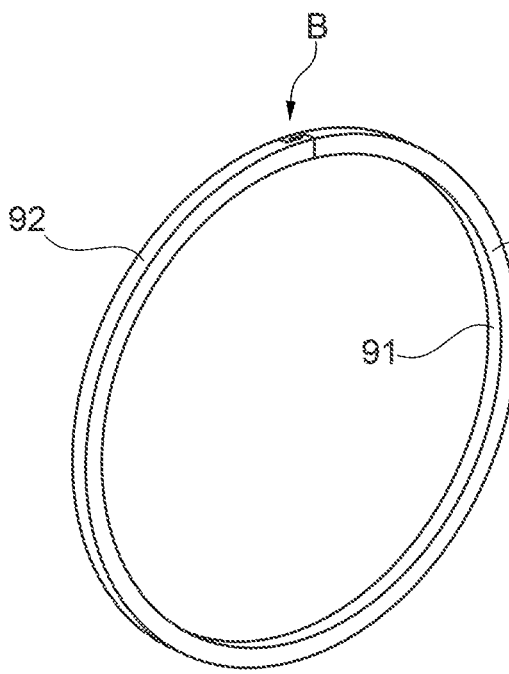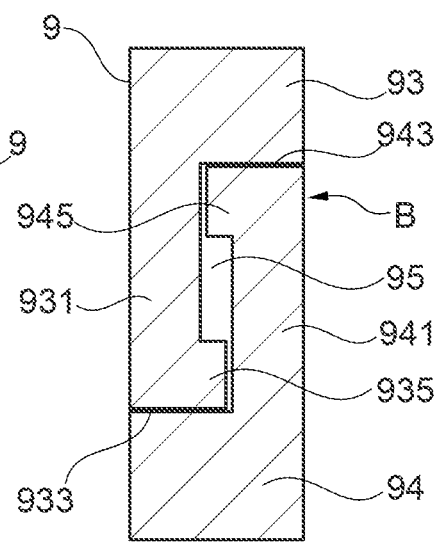
Fig. 6a    Fig. 6b

GEARED TURBOFAN ENGINE AND SPLINE ARRANGEMENT

This application claims priority to German Patent Application DE102018106484.5 filed Mar. 20, 2018, the entirety of which is incorporated by reference herein.

DESCRIPTION

The invention relates to a geared turbofan engine according to the generic term of patent claim 1 as well as to a spline arrangement.

In a geared turbofan engine, it is known to lubricate the toothing area of a spline shaft connection between the drive shaft and the sun gear of a planetary gearbox of the geared turbofan engine with oil. Here, it is necessary to ensure that a sufficient oil level is present in the toothing area. For this purpose, it is necessary, for one thing, to seal the toothing area by means of sealing elements. For another thing, it is also necessary to introduce oil into the toothing area during operation. Another problem is to ensure that the sealing elements are not damaged during mounting.

What is known from DE 10 2016 204 070 A1 is a spline shaft connection in which a sealing ring is arranged inside a seal housing groove at the one end of the spline shaft connection.

The present invention is based on the objective of providing a geared turbofan engine in which an effective seal is present for securing a sufficient oil level in the toothing area of the spline shaft connection between the drive shaft and the sun gear. What is further to be provided is a method in which a sealing ring can be mounted for reliably sealing a spline shaft connection without any danger of damage occurring.

The objective is achieved through a geared turbofan engine with the features of claim 1, a method for mounting a planetary gearbox on a turbine shaft with the features of claim 17, and a spline arrangement with the features of claim 18. Embodiments of the invention are specified in the subclaims.

Accordingly, what is regarded in a first aspect of the invention is a geared turbofan engine that has a fan stage, a fan shaft via which the fan stage is driven, a turbine shaft, and a planetary gearbox a, wherein the planetary gearbox couples the fan shaft and the turbine shaft to each other. Here, the planetary gearbox has a sun gear that rotates about a rotational axis of the geared turbofan engine and is driven by the turbine shaft, wherein the rotational axis defines an axial direction of the geared turbofan engine. Here, the axial direction is defined in such a manner that it is directed from the fan towards the turbine of the engine. The turbine shaft forms an outer spline toothing and the sun gear forms an inner spline toothing, wherein the outer spline toothing and the inner spline toothing form a spline shaft connection of the turbine shaft and the sun gear. The spline shaft connection has a toothing area that is lubricated with oil. Further, sealing means are provided, sealing off the oil in the toothing area against axial leaking.

It is provided that the sealing means have an elastic sealing ring that has a variable diameter and is springing outwards, and that is arranged inside a groove that extends in the circumferential direction of the turbine shaft. Here, with its radially outer circumferential surface, the sealing ring abuts at an inner circumferential surface of the sun gear that is formed by the sun gear axially adjacent or laterally to the inner spline toothing.

The fact that the sealing ring is formed in an elastic and outwardly springing manner means that in the installed state the elasticity of the sealing ring is provided in such a manner that the sealing ring has the tendency to enlarge its diameter. The natural diameter of the sealing ring corresponds to the original shape of the sealing ring, taken by the sealing ring when no forces act upon it. If the sealing ring takes a diameter that is smaller as compared to the natural diameter, it exerts a force onto the surrounding element that forces it into the smaller diameter.

According to an exemplary embodiment, the sealing ring consists of a hard material. For example, the sealing ring may consist of steel, for example a steel with a Vickers hardness HV in the range of 400 HV 10 to 600 HV 10, or of a cast material, e.g. cast iron. According to an alternative embodiment, the sealing ring consists of a hard plastic, for example of polytetrafluorethylene (PTFE) or of a polyamide-imide (PAI), e.g. Torlon®. Here, it is provided in one embodiment that the plastic is resistant to wear as well as ageing. According to one embodiment, it is provided that the hardness of the sealing ring is lower than the hardness of the material of which the turbine shaft and the sun gear or the spline shaft connection are made. By using a sealing ring made of a hard material, a long service life of the sealing ring is facilitated. In this manner, maintenance times and costs are reduced. By using a sealing ring of a hard material, it is in particular avoided that the sealing ring becomes brittle and loses functionality over time, and in the worst case even breaks. If the sealing ring inherently has a certain brittleness, the material for the sealing ring is selected in such a manner that the material does not become more brittle or starts ageing over time.

The solution according to the invention provides an arrangement in which, due to the embodiment of the sealing ring in an elastic manner and with a variable diameter, the gap extending in the axial direction next to the toothing area of the spline shaft connection between the sun gear and the turbine shaft is reliably sealed. Here, the elastic embodiment and outwardly directed tension of the sealing ring ensures that the sealing ring abuts at the adjoining circumferential surface of the sun gear under tension and thus in a sealing manner. At the same time, the elastic sealing ring provided with a variable diameter facilitates simplified mounting, since it is possible to press the sealing ring together into smaller diameters during mounting without damaging the ring.

It is to be understood that the feature of the sealing ring having a variable diameter represents an inherent characteristic of the sealing ring. This feature is not to be understood in the sense that the diameter of the sealing ring is still modifiable or settable in the geared turbofan engine after mounting completed.

In one embodiment of the invention, it is provided that the sealing ring has two ends that adjoin each other and in doing so overlap with each other, wherein the degree of overlapping determines the diameter of the sealing ring. This applies independently of whether the inner diameter or the outer diameter of the sealing ring is regarded. Thus, the mentioned statement applies to the inner diameter as well as to the outer diameter. This also applies to further statements with respect to the diameter, unless a distinction is made between the inner diameter and the outer diameter.

Here, it is provided in one embodiment that the ends of the sealing ring overlap with each other in a freely movable manner and in doing so respectively form one extension with one axial abutment surface, wherein the extensions abut each other at their axial abutment surfaces. A stop end or the like for limiting the extension of the sealing ring is not provided in this embodiment.

In an alternative embodiment, it is provided that the ends of the sealing ring overlap with each other and in doing so respectively form one extension with an axial abutment surface and one axial projection, wherein the degree of overlapping of the ends has a maximum and a minimum, and wherein the minimum degree of overlapping is defined by the axial projections of the two extensions, which come into engagement with each other at the minimum degree of overlapping. In this embodiment, the extension of the sealing ring is limited by the mentioned projections. Here, the diameter of the sealing ring is minimal at the maximum degree of overlapping, and the diameter of the sealing ring is maximal at the minimum degree of overlapping.

In another embodiment of the invention, it is provided that the sealing ring and/or the groove are formed in such a manner that oil can be introduced into the toothing area through a radial gap below the sealing ring. Here, the radial gap extends between the sealing ring and the bottom or the tooth root plane of the toothing of the turbine shaft. In this manner, it is possible to continuously supply oil to the toothing area of the spline shaft connection during operation, so that a sufficient oil level is always ensured in the toothing area.

For this purpose, it is provided in one embodiment that, at its radially inner circumferential surface, the sealing ring has concave indentations extending in the radial direction. The indentations are for example formed in a bow-shaped manner and distributed in an even manner across the inner circumference of the sealing ring. The indentations allow for the oil to be introduced into the toothing area through the radial gap extending between the indentations and the turbine shaft. At that, oil may for example be sprayed onto the gap from the lateral direction.

In one embodiment of the invention, it is provided that the groove inside of which the sealing ring is arranged is formed in an extension portion of the outer spline toothing of the turbine shaft that extends in the axial direction to beyond the toothing area. According to this embodiment, the outer spline toothing of the turbine shaft thus forms an area that extends axially adjacent at the toothing area and thus represents an extension portion of the outer spline toothing. Here, it can be provided that the groove that is formed in the extension portion and inside of which the sealing ring is arranged, has a smaller radial depth than the outer spline toothing of the outer shaft. Also, in this way a radial gap is provided below the sealing ring, via which oil can be introduced into the toothing area. At that, oil may for example be sprayed onto the gap from the lateral direction.

It is to be understood that, in the extension portion inside of which the groove is formed, the outer spline toothing of the turbine shaft does not necessarily have the same toothing as in the toothing area of the spline shaft connection. For example, it can be provided that the outer spline toothing forms a lesser number of teeth in the extension portion than in the toothing area. It is enough to provide only so many teeth that it is ensured that the sealing ring can be axially positioned in the groove in a reliable manner. For this purpose, a maximum of three teeth is sufficient. Of course, it can also be provided that the toothing in the extension portion is formed in the same manner as in the toothing area.

In another embodiment of the invention, it is provided that, in addition to the sealing ring, the sealing means which seal off the oil in the toothing area against any axial leaking have a further sealing element that is arranged or formed axially opposite the sealing ring, and thus on the axially frontal side of the toothing area. For example, it can be provided that the further sealing element is formed by a further sealing ring that is formed in one piece with the sun gear or is attached at the same. Here, according to one embodiment, the further sealing ring is arranged and formed in such a manner that it forms a gap to the turbine shaft through which oil can be introduced into the toothing area in the axial direction. According to this embodiment, oil from the axially frontal side can be introduced into the toothing area of the spline shaft connection, for example it can be sprayed in.

What is provided in a further embodiment of the invention is a means that acts together with the sealing ring and couples the rotation of the sealing ring to the rotation of the turbine shaft. The mentioned means ensures that the sealing ring rotates in unison with the drive shaft, or that it is coupled to the turbine shaft in the circumferential direction. This in particular means that, if the turbine is switched off, the sealing ring is also decelerated and is not rotated any further by the sun gear due to its abutment at the same.

According to one embodiment, the mentioned means is formed by a pin that is connected to the turbine shaft and extends in the radial direction, and that passes through a corresponding opening in the sealing ring. According to another embodiment, the mentioned means is formed by an axial extension of the sealing ring that meshes into the outer spline toothing of the turbine shaft. In some cases, the coupling of the sealing ring with the turbine shaft is realized via the mentioned means.

In another embodiment of the invention, it is provided that the sun gear has an axially rear, radially extending end face, and forms a chamfer at the axially rear end face radially inside, with the chamfer being oriented and dimensioned in such a manner that, if the sun gear is pushed onto the turbine shaft for mounting purposes, the sealing ring comes to rest at the chamfer of the sun gear, the sealing ring is pressed together in the radial direction by the shape of the chamfer if a further axial displacement of the sun gear occurs, and finally abuts under tension at the inner circumferential surface of the sun gear with its radially outer circumferential surface.

Due to the acting together of, for one thing, a chamfer at the one end face of the sun gear and, for another thing, of the elastic sealing ring having a variable diameter and springing outwards, an effective and secure mounting and placement of the sealing ring is facilitated in this embodiment of the invention. Here, the sealing ring is pressed together by the chamfer during the mounting motion. After mounting has been completed, the sealing ring abuts under tension an the facing circumferential surface of the sun gear. The variable diameter of the sealing ring facilitates the realization of two functions. For one thing, an effective mounting is facilitated in which the danger of damage to the sealing ring is minimized and which can be performed "blindly" in the sense that no optical tracking of the sealing ring is necessary during mounting. For another thing, the variable diameter of the sealing ring makes it possible to provide an effective seal in which the sealing ring abuts in a sealing manner at the counter surface (the facing circumferential surface of the sun gear).

As further elements, the planetary gearbox of the geared turbofan engine may comprise:

a plurality of planetary wheels that are driven by the sun gear, a ring gear with which the plurality of planetary wheels is in engagement, and a plurality of planetary pins, wherein respectively one planetary pin is arranged in a planetary wheel, and the planetary pin and the planetary wheel form a lubricated bearing, wherein the planetary pins are coupled with a torque carrier and the torque carrier is coupled with the fan shaft.

According to further aspect of the invention, the invention relates to a method for mounting a planetary gearbox on a turbine shaft for producing a geared turbofan engine according to claim 1, wherein the sun gear of the planetary gearbox is pushed onto the turbine shaft in the axial direction. The method comprises the following steps:

placing the sealing ring into the groove of the turbine shaft, pushing the sun gear in the axial direction onto the turbine shaft, wherein the sun gear has a chamfer at its axially rear end face that is oriented and dimensioned in such a manner that, if an axial displacement of the sun gear occurs, the sealing ring comes to rest against the chamfer of the sun gear, and the sealing ring is pressed together in the radial direction by the shape of the chamfer if a further displacement of the sun gear occurs, and in the finished mounted position, the sealing ring abuts with tension at the inner circumferential surface of the sun gear adjacent at the toothing area.

As has already been explained, through the acting together, on the one hand, of a chamfer at the one end face of the sun gear and for another thing of the elastic sealing ring that has a variable diameter and is springing outwards, this aspect of the invention facilitates an effective and secure mounting and placement of the sealing ring, wherein the sealing ring is pressed together by the chamfer during mounting motion.

In a further aspect of the invention, the invention relates to a spline arrangement, comprising:

a drive shaft that has an outer spline toothing, a drive element that has an inner spline toothing and is driven by the drive shaft, wherein the outer spline toothing and the inner spline toothing form a spline shaft connection of drive shaft and drive element, the spline shaft connection has a toothing area that is lubricated with oil, and sealing means are provided, sealing off the oil in the toothing area against any axial leaking.

Here, it is provided that the sealing means have an elastic sealing ring that has a variable diameter and is springing outwards, and which abuts an inner circumferential surface of the drive element with its radially outer circumferential surface.

According to one embodiment, the outer spline toothing of the drive shaft extends to axially beyond the toothing area, and in doing so forms an extension portion of the outer spline toothing axially adjacent to (or next to) the toothing area. The sealing ring is arranged inside a groove that extends in the circumferential direction of the drive shaft, wherein the groove is formed in the extension portion in the outer spline toothing of the drive shaft.

In a further embodiment, it is provided that the sealing ring has two ends that adjoin each other, and in doing so overlap with each other, wherein the degree of overlapping determines the diameter of the sealing ring, and/or that the sealing ring and/or the groove are formed in such a manner that oil can be introduced into the toothing area through a radial gap below the sealing ring. Further embodiments of the spline arrangement have features that correspond to the features indicated in claims 3-16.

The spline arrangement according to the invention may for example be formed in a planetary gearbox that may for example be part of a geared turbofan engine.

It is to be understood that the present invention is described with respect to a cylindrical coordinate system, having the coordinates x, r and φ. Here, x indicates the axial direction, r indicates the radial direction, and φ indicates the angle in the circumferential direction. Here, the axial direction is defined by the rotational axis of the planetary gear, which is identical with the machine axis of a geared turbofan engine inside of which the planetary gearbox is arranged. Beginning at the x-axis, the radial direction points radially outward. Terms such as "in front", "behind", "frontal" and "rear" always refer to the axial direction or the flow direction inside the engine inside of which the planetary gearbox is arranged. Terms such as "outer" or "inner" refer to the radial direction.

In the following, the invention is explained in more detail based on multiple exemplary embodiments by referring to the Figures of the drawing. Herein:

FIG. 5a shows a first exemplary embodiment of the sealing ring of FIGS. 3 and 4;

FIG. 5b shows the detail A of the exemplary embodiment of FIG. 5a;

FIG. 6a shows a second exemplary embodiment of the sealing ring of FIGS. 3 and 4;

FIG. 6b shows the detail B of the exemplary embodiment of FIG. 6a;

Figure 3:
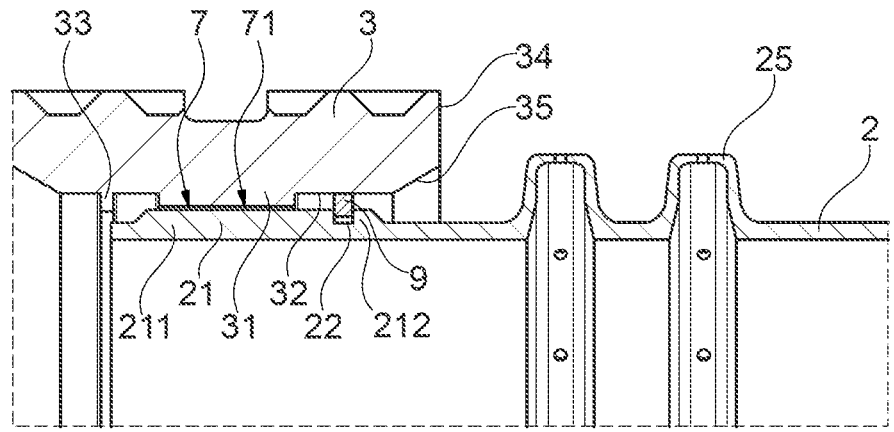
FIG. 3 shows, in partially sectioned view, an exemplary embodiment of a spline shaft connection between a drive shaft and a sun gear, wherein the spline shaft connection comprises an elastic sealing ring that has a variable diameter and that is arranged inside a groove that is formed in the drive shaft.
Figure 4:
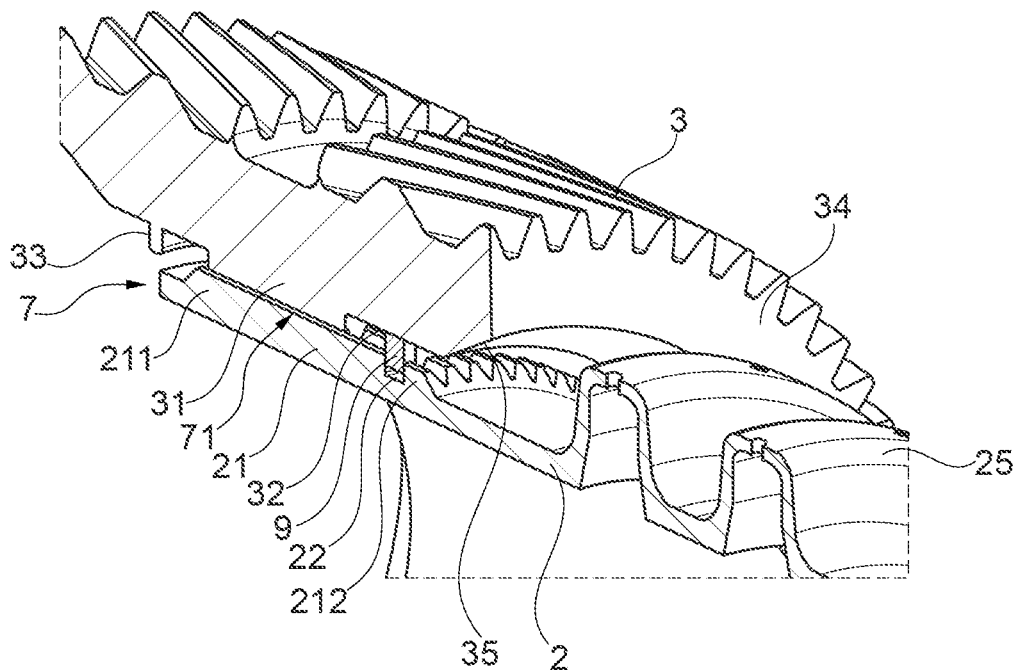
FIG. 4 shows the spline shaft connection of FIG. 3 in a partially sectioned perspective view.
Figure 9:
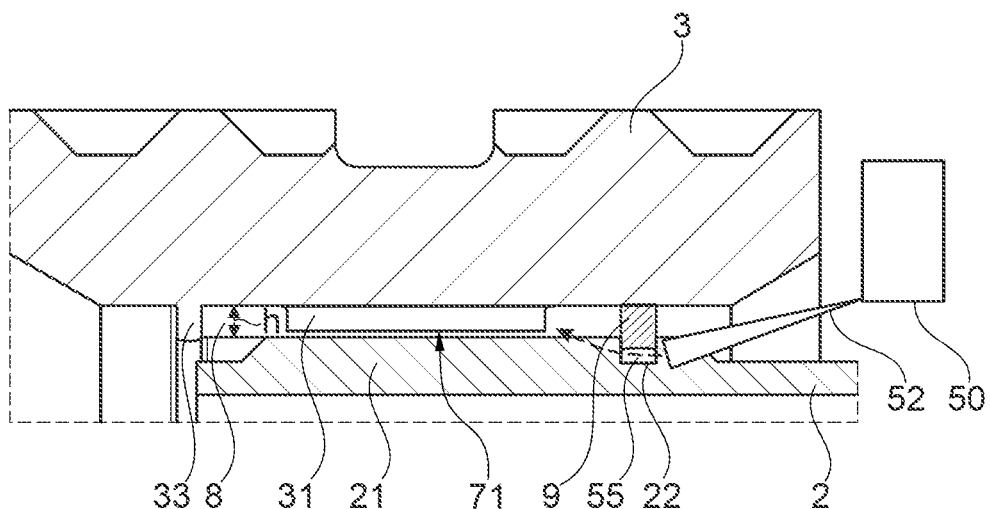
Figure 10:
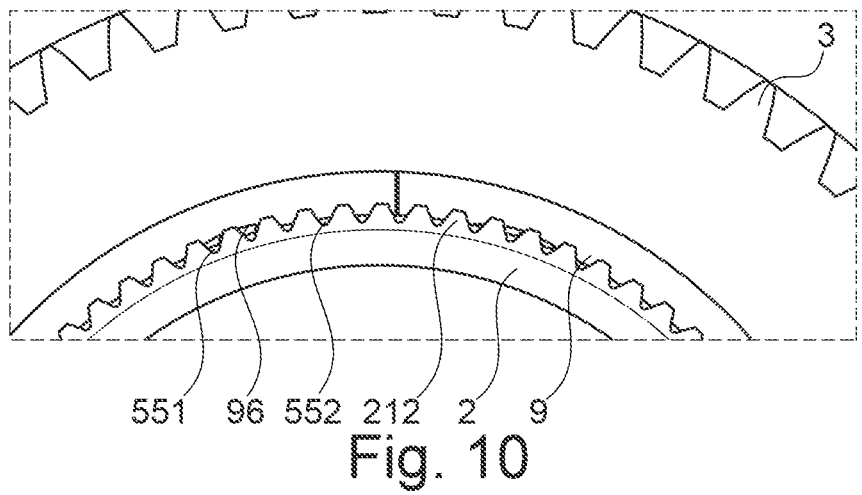
Figure 10A:
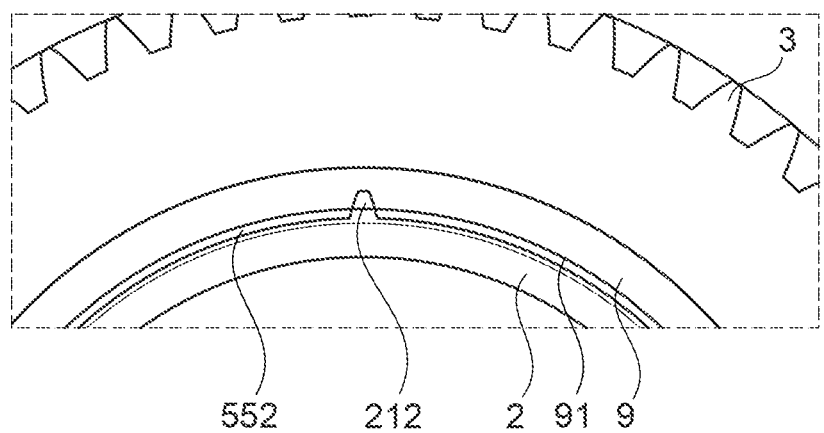
Figure 11:
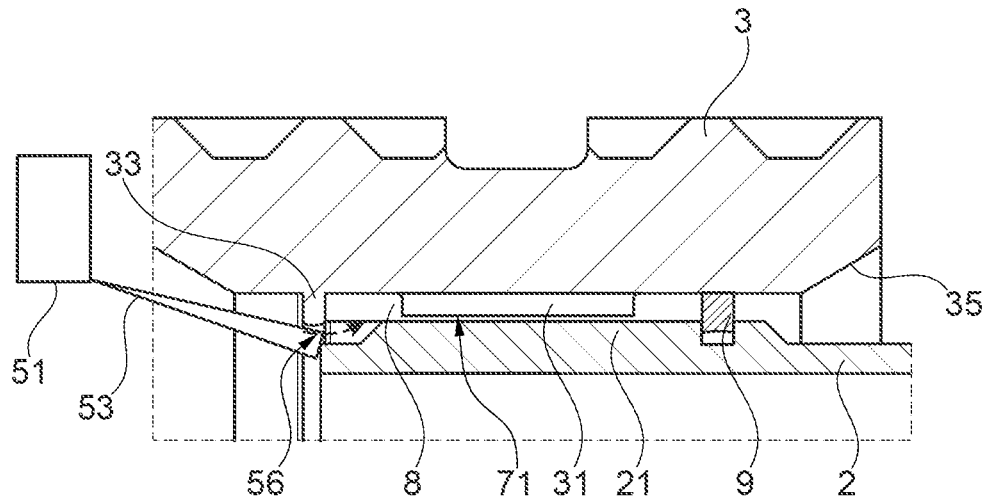
Figure 12:
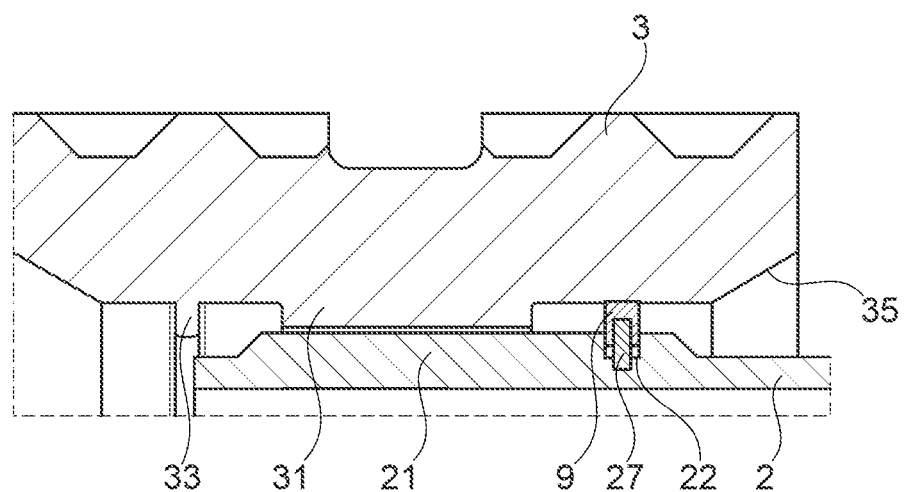
Figure 13:
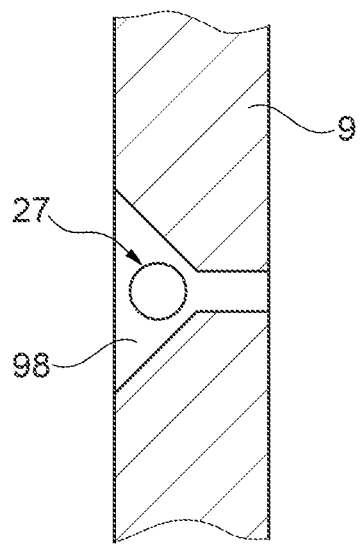
Figure 14:
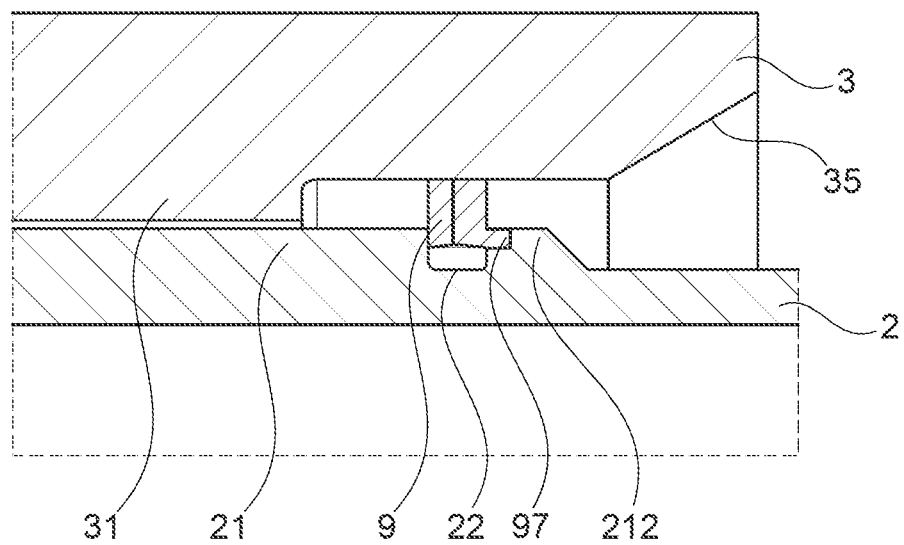

FIG. 9 schematically shows the introduction of oil from the axially rear side into the toothing area of the spline shaft connection of FIGS. 3 and 4, wherein the oil is introduced through a gap that is formed below the sealing ring;

FIG. 10 shows a view from the back of FIG. 9 in the area of the sealing ring, also showing the radial gap between the sealing ring and the drive shaft;

FIG. 10a shows a view corresponding to FIG. 10, also showing the radial gap between the sealing ring and the drive shaft, wherein the outer spline toothing forms a reduced number of teeth in an extension portion;

FIG. 11 schematically shows the introduction of oil from the axially frontal side into the toothing area of the spline shaft connection of FIGS. 3 and 4, wherein the oil is introduced through a gap that is formed between an axially frontal sealing ring that is connected to the sun gear and the drive shaft;

FIG. 12 shows, schematically and in the longitudinal section, an exemplary embodiment of a spline shaft connection between a drive shaft and a sun gear in which a pin connected to the drive shaft is provided, coupling the sealing ring to the drive shaft;

FIG. 13 schematically shows the arrangement of the pin and the sealing ring of FIG. 12 in a view from above; and FIG. 14 shows, schematically and in the longitudinal section, an exemplary embodiment of a spline shaft connection between a drive shaft and a sun gear in which the sealing ring forms an axial extension that engages with the outer spline toothing of the drive shaft.

Figure 1:
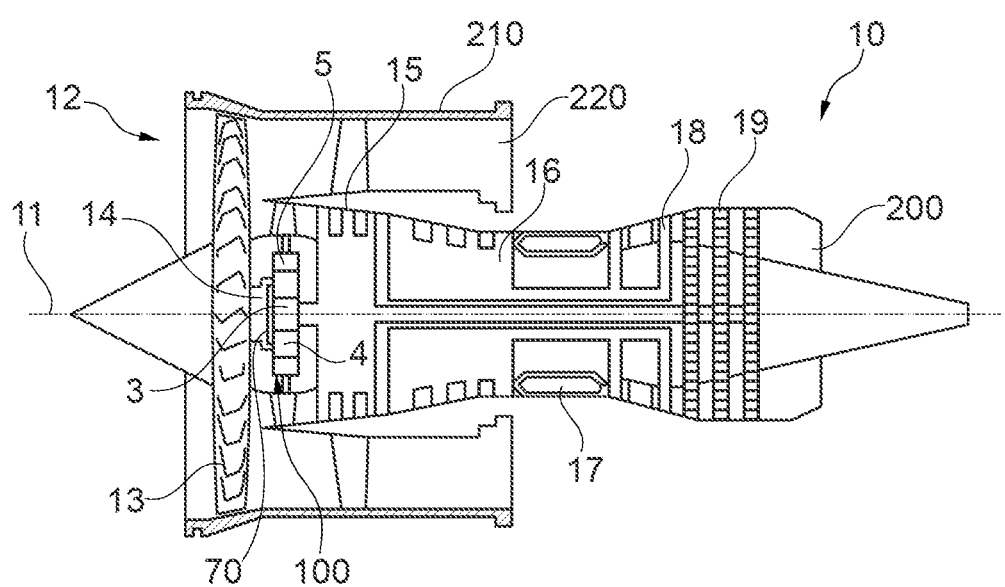
FIG. 1 shows a simplified schematic sectional view of a geared turbofan engine in which the present invention can be realized.

FIG. 1 shows a geared turbofan engine 10 with a rotation axis 11 that is provided for being used in airplanes. In the direction of the axial through flow, the geared turbofan engine 10 successively comprises an air intake 12, a fan stage 13 (in general also more than one fan stage 13 is possible), a fan shaft 14, a gear 100, a medium-pressure compressor 15, a high-pressure compressor 16, a combustion device 17, a high-pressure turbine 18, a medium-pressure turbine 19, and a nozzle 20. A fan housing 210 surrounds the fan stage 13 and defines the air intake 12.

In general, the geared turbofan engine 10 operates in a conventional manner, wherein air entering the intake 12 is accelerated by the fan stage 13. Here, two air flows are created: A first flow flows into the medium-pressure compressor 15, a second air flow flows through a bypass channel 220, wherein the second air flow provides the greatest portion of the thrust of the geared turbofan engine 10. The medium-pressure compressor 15 compresses the entering air flow before it reaches the high-pressure compressor 16 inside of which further compression occurs. The compressed air that is discharged from the high-pressure compressor 16 is introduced into the combustion device 17 where it is intermixed with fuel, and the mixture is then combusted. The hot combustion gases are decompressed in the high-pressure turbine 18 and in the medium-pressure turbine 19 before being discharged through the nozzle 200, and thus providing additional thrust.

Thus, the geared turbofan engine 10 forms a bypass channel 220 and a primary flow channel behind the fan stage 13. The primary flow channel leads through the core engine (gas turbine) that comprises the medium-pressure compressor 15, the high-pressure compressor 16, the combustion device 17, the high-pressure turbine 18, and the medium-pressure turbine 19. The bypass channel 220 guides air which is sucked in by the fan stage 13 during operation of the geared turbofan engine 10 past the core engine.

Via shaft devices, the high-pressure turbine 18 and the medium-pressure turbine 19 respectively drive the high-pressure compressor 16 and the medium-pressure compressor 15. A medium-pressure shaft drives the fan stage 13 via the gear 100. Here, the gear 100 is embodied as a reduction gear which reduces the rotational speed of the fan stage 13 as compared to the medium-pressure compressor 15 and to the medium-pressure turbine 19. In the shown embodiment, the gear 100 is a planetary gearing with a static ring gear 5 and circumferential planet gears 4 rotating in the ring gear 5. The gear 100 is driven via a sun gear 3 that is coupled to the medium-pressure shaft. In the shown embodiment, the drive is provided via a torque carrier 70 that is coupled to the planetary wheels 4. The torque carrier 70 is coupled to the fan shaft 14 that drives the fan stage 13.

In general, also other embodiments of the gear 100 are possible, wherein e.g. the ring gear 5 can be formed in a movable manner, so that the drive is provided via the ring gear 5.

The embodiment of the geared turbofan engine 10 according to FIG. 1 is to be understood merely as an example. In particular, the arrangement of the shafts can also be chosen to be different, wherein in general arrangements with two or three shafts are possible. For example, a three-shaft arrangement can alternatively be provided that comprises a low-pressure shaft connecting the low-pressure turbine to the fan, a medium-pressure shaft connecting the medium-pressure turbine to the medium-pressure compressor, and a high-pressure shaft connecting the high-pressure turbine to the high-pressure compressor. Here, the fan stage 13 is connected via a gear to the low-pressure shaft.

With the rotational axis 11, the described components have a common rotational or machine axis. The rotation axis 11 defines an axial direction of the engine 10. A radial direction of the engine 10 extends perpendicular to the axial direction.

Figure 2:
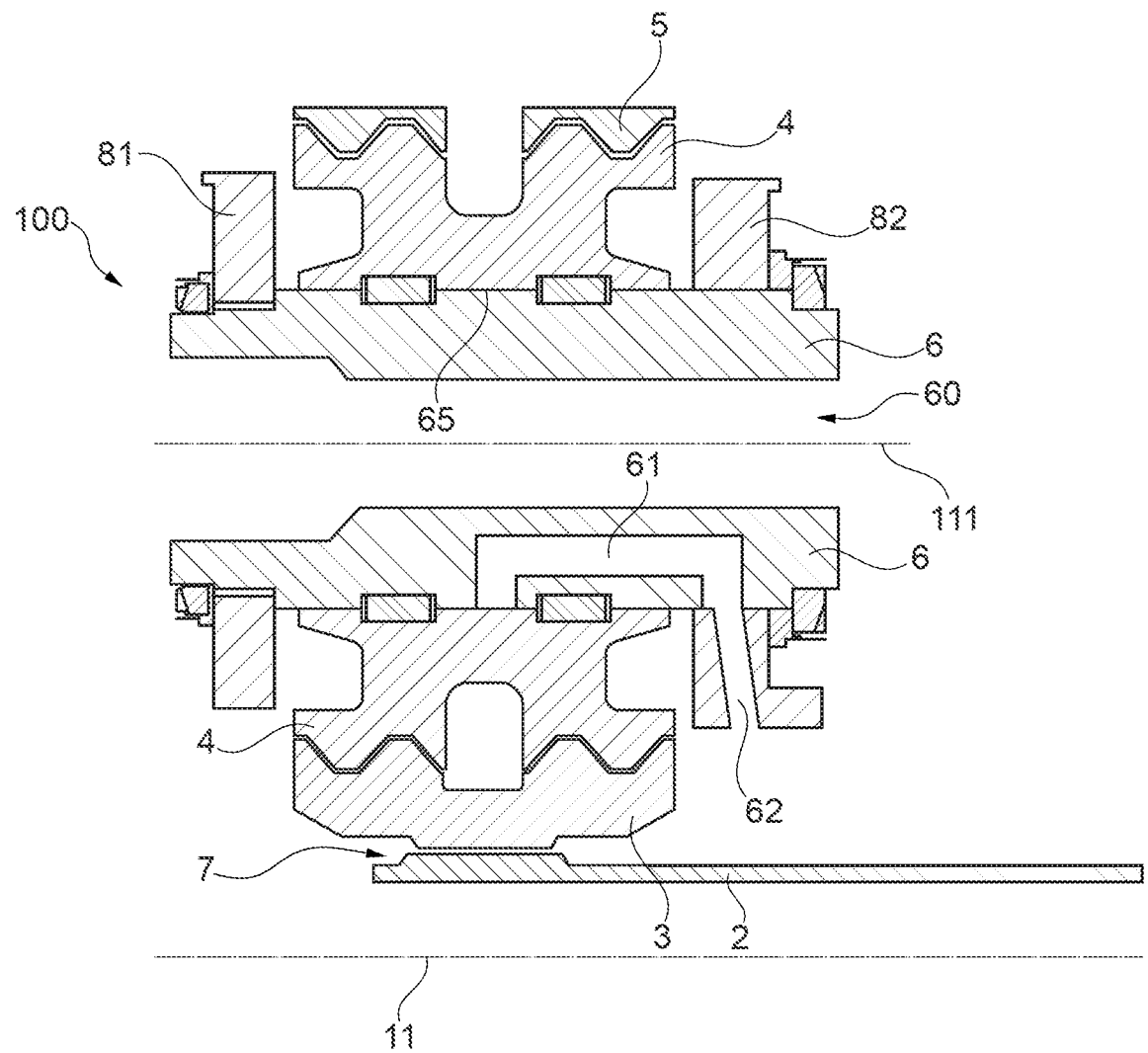
FIG. 2 shows a sectional view of elements of a planetary gearbox that is suitable for being used in a geared turbofan engine according to FIG. 1.

FIG. 2 shows an exemplary embodiment of a planetary gearbox 100 of the geared turbofan engine 10 of FIG. 1 in a sectional view. FIG. 2 shows an exemplary embodiment of a planetary gearbox 100 in a sectional rendering. The planetary gearbox 100 comprises a sun gear 3 that is driven by a drive shaft or sun shaft 2. The sun shaft 2 is the medium-pressure shaft of FIG. 1, or generally a turbine shaft. Here, the sun gear 3 and the drive shaft 2 rotate about a rotation axis 11. The rotational axis of the planetary gearbox 100 is identical to the machine axis of the geared turbofan engine 10.

The planetary gearing 100 further comprises a plurality of planet wheels 4 of which one is shown in the sectional rendering of FIG. 2. The sun gear 3 drives the plurality of planetary wheels 4, wherein a toothing of the sun gear 3 is in engagement with the toothing 45 of the planetary wheel 4.

The planetary wheel 4 is embodied in a hollow-cylindrical manner, and forms an outer shell surface and an inner shell surface. Driven by the sun gear 3, the planetary wheel 4 rotates about a rotational axis 111 that extends in parallel to the rotational axis 11. The outer shell surface of the planetary wheel 4 forms a toothing that is in engagement with the toothing of a ring gear 5. The ring gear 5 is arranged in a stationary, i.e. non-rotating, manner. The planetary wheels 4 rotate as a result of being coupled to the sun gear 3, and in doing so travel along the circumference of the ring gear 5. The rotation of the planetary wheels 4 along the circumference of the ring gear 5 and thus about the rotational axis 111 is slower than the rotation of the drive shaft 2, whereby a reduction is provided.

Adjacent to its inner shell surface, the planetary wheel 4 has a centered axial opening. Inserted into the opening is a planetary pin 6 which itself has an axial bore 60, wherein the planetary pin 6 and the planetary wheel 4 form a bearing 65 at their mutually facing surfaces, for example a roller bearing or a slide bearing.

FIG. 2 further shows a frontal support plate 81 and a rear support plate 82. The planetary pin 6 is attached by means of the frontal support plate 81 and the rear support plate 82, for example it may be screwed or welded together with them. For example, the frontal support plate 81 is connected to a torque carrier 70 that is coupled to the fan shaft.

Provided for lubricating the bearing 65 between the planetary pin 6 and the planetary wheel 4 is an oil supply appliance that comprises an oil supply channel 62 via which oil of a circulating oil system is guided inside lubricating film openings 61 into the planetary pin 6.

What is relevant in the context of the present invention is the coupling of the sun gear 3 to the drive shaft 2 with respect to a spline shaft connection 7 realized for this purpose.

FIGS. 3 and 4 show an exemplary embodiment of a spline shaft connection 7 for coupling a drive shaft 2 to a sun gear 3. Even as the invention is described by way of example based on a spline shaft connection that couples a drive shaft to a sun gear of a planetary gear, the principles of the present invention can be used in a corresponding manner for any spline arrangement in which a drive shaft and a drive element are connected to each other via a spline shaft connection.

According to FIGS. 3 and 4, the drive shaft 2, which in the shown context is a turbine shaft, comprises an outer spline toothing 21. In a corresponding manner, the sun gear 3 comprises an inner spline toothing 31. The outer spline toothing 21 and the inner spline toothing 31 form a spline shaft connection 7. The spline shaft connection 7 comprises a toothing area 71 in which the keys or keyways of the inner spline toothing and the outer spline toothing are in engagement. The toothing area 71 is lubricated with oil. In order for the oil not to leak axially from the toothing area, two sealing rings 9, 33 are provided, axially sealing the toothing area 71.

The outer spline toothing 21 of the drive shaft 2 forms two sections or areas 211, 212 that are arranged at an axial distance from each other. Together with the inner spline toothing 31 of the sun gear 3, the first area 211 forms the toothing area 71 of the spline shaft connection 7. The second area 212 extends in the axial direction to beyond the toothing area 71, and in doing so forms an extension portion of the outer spline toothing 21 axially adjacent at the toothing area 71.

In the area 212 that forms the extension portion, a groove 22 is formed, extending in the circumferential direction of the drive shaft 2. A sealing ring 9 is arranged inside the groove 22, and thus in the area of area 212. In the shown exemplary embodiment, the toothing in the second area 212 is identical to the toothing in the first area 211, in particular the same number of teeth is provided in the circumferential direction. However, this is not necessarily the case. In general, it can alternatively also be provided that the toothing in the second area 212 is embodied in a different manner than the toothing in the first area 211, in particular that it has a lower number of teeth. In this manner, the production-technical effort can be reduced. Here, the required number of teeth in the second area 212 is such that the groove 22 can be defined and the sealing ring 9 can be axially positioned through the groove 22 in a reliable manner. A related exemplary embodiment is explained based on FIG. 10a.

As will be explained in more detail with respect to FIGS. 5a, 5b, 6a, 6b, the sealing ring 9 is formed so as to be elastic and to be springing outwards, wherein the sealing ring 9 has a modifiable diameter.

With its radially outer circumferential surface, the sealing ring 9 abuts at an inner circumferential surface 32 of the sun gear 3 which the sun gear 3 forms axially adjacent at the inner spline toothing 31. Due to the sealing ring 9 being embodied so as to be springing outwards, the sealing ring 9 rests against the circumferential surface 32 of the sun gear 3 in a sealing manner and with a radial force.

The further sealing ring 33 is arranged in the axial direction in front of the toothing area 71. This sealing ring 33 is formed in one piece with the sun gear 3, or is affixed at the same. The two sealing rings 9, 33 ensure a sufficiently high oil level in the toothing area 71.

FIGS. 3 and 4 further show bellows-like bulges of the drive shaft 2 that serve for embodying it in a flexible manner.

With respect to the mounting of the spline shaft connection 7, it is to be observed that the planetary gearbox is pushed with the sun gear 3 onto the drive shaft 2 during mounting. This means that the sealing ring 9 is not visible during mounting, and cannot be examined after mounting. In order to ensure that despite this fact the sealing ring 9 is mounted in a secure, exact and damage-free manner, the sun gear 3 has a chamfer 35 at its axially rear end face 34 radially inside, with which the sealing ring 9 having a variable diameter acts together during mounting, as will be explained based on FIGS. 8a-8c.

FIGS. 5a, 5b show a first exemplary embodiment of a sealing ring 9 that has a variable diameter. The sealing ring 9 has a radially inner circumferential surface 91 and a radially outer circumferential surface 92. As explained, the radially outer circumferential surface 92 adjoins the inner circumferential surface 32 of the sun gear 3. In the shown exemplary embodiment, both circumferential surfaces 91, 92 are formed in a cylindrical manner, which is not necessarily the case, however.

In order to realize a modifiable diameter of the sealing ring 9, the sealing ring 9 forms a separation point, and at the latter forms a displaceable area A that is shown in FIG. 5b in an enlarged manner in a view from above. According to this, the displaceable area A is formed by two ends 93, 94 of the sealing ring 9 that adjoin each other, and in doing so overlap with each other, wherein the degree of overlapping determines the diameter of the sealing ring. The smaller the degree of overlapping, the larger is the diameter of the sealing ring 9.

For providing a displaceable overlapping, each end 93, 94 has an extension 931, 941 that occupies half the width of the sealing ring 9. Here, each extension 931, 941 forms an axial abutment surface 932, 942, which abut each other and along which the ends 93, 94 of the sealing ring 9 are displaceable with respect to one another. Here, FIG. 5b shows the situation in which the degree of overlapping is maximal, and accordingly the diameter of the sealing ring 9 is minimal. At the maximum degree of overlapping, the end faces 933, 943 of the ends 93, 94 abut the respectively other end 94, 93.

The minimum degree of overlapping and the maximum diameter of the sealing ring 9 is determined by the original shape of the sealing ring 9, i.e. the shape taken by the sealing ring when no forces act upon it. Here, according to one embodiment, this original shape is chosen in such a manner that the extensions 931, 941 barely minimally overlap, so that when forces act upon the sealing ring 9 that lead to a reduction of the diameter of the sealing ring 9, the extensions 931, 941 are guided along their abutment surfaces 932, 942 in a defined manner. However, in general it is also conceivable that the extensions 931, 932 are arranged at a distance in the circumferential direction in their original shape.

The sealing ring 9 is formed so as to be springing outwards, i.e. it shows the tendency to take the largest possible diameter.

FIGS. 6a, 6b show an alternative embodiment of a sealing ring 9 that also has a separation point and forms a displaceable area B thereat. The displaceable area B is shown in FIG. 6b in an enlarged manner in a view from above. The embodiment of FIGS. 6a, 6b differs from the embodiment of FIGS. 5a, 5b in that respectively one axial projection 935, 945 is formed at the extensions 931, 932, leading to a minimal overlapping and thus to a maximum diameter of the sealing ring 9 being achieved if the axial projections 935, 945 come into engagement with each other. In this embodiment, a minimum diameter and a maximum diameter of the sealing ring 9 are defined. Here, the sealing ring 9 is thus formed to be springing outwards, i.e., it has a tendency to take the maximum diameter.

Figure 7:
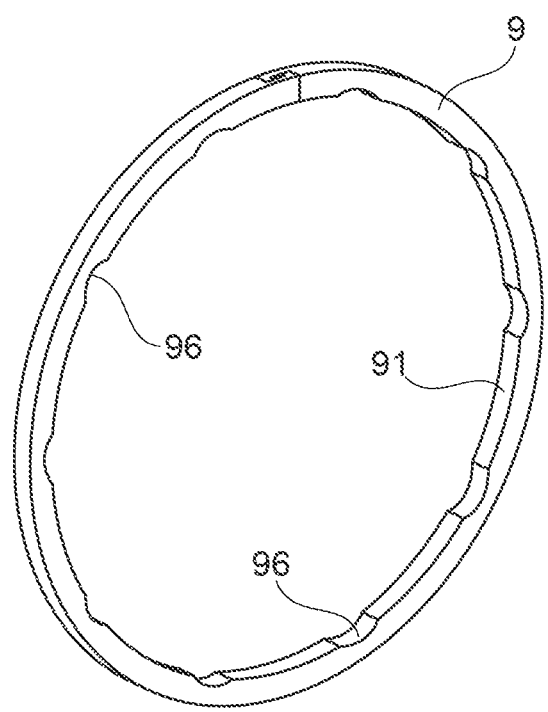
FIG. 7 shows a third exemplary embodiment of the sealing ring of FIGS. 3 and 4, wherein the sealing ring has indentations at its inner circumference.

FIG. 7 shows a further exemplary embodiment of a sealing ring 9. The sealing ring 9 is characterized by having concave indentations 96 extending in the radial direction at its radially inner circumferential surface 91. The indentations 96 may for example be formed in a bow-shaped manner and distributed in an even manner across the inner circumference of the sealing ring 9. These indentations 96 provide a possibility for transporting oil between the sealing ring 9 and the drive shaft into the toothing area of the spline shaft connection, as will be explained based on FIGS. 9 and 10. In FIG. 7, the variability of the diameter of the sealing ring 9 is not separately shown. It can be embodied according to FIGS. 5*a*, 5*b*, 6*a*, 6*b*.

Figure 8A:
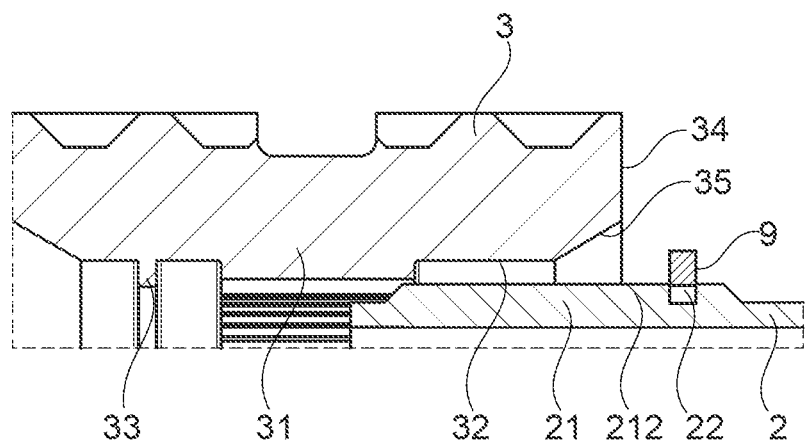
FIG. 8a shows a first method step for mounting the sun gear of FIGS. 3 and 4 on the drive shaft, wherein the sealing ring is placed inside a groove of the turbine shaft.
Figure 8B:
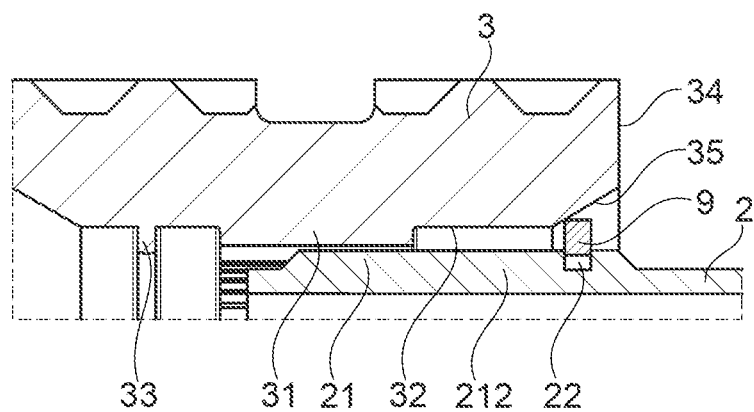
FIG. 8b shows a second method step for mounting the sun gear of FIGS. 3 and 4 on the drive shaft, wherein the sealing ring comes to rest against a chamfer at an axially rear end face of the sun gear.
Figure 8C:
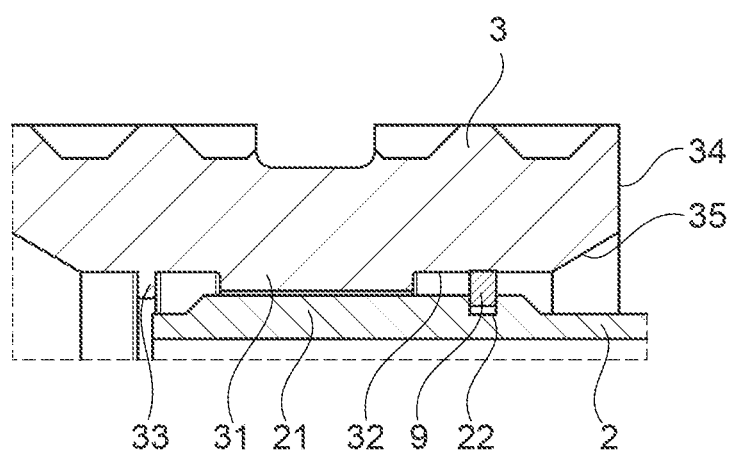
FIG. 8c shows a third method step for mounting the sun gear of FIGS. 3 and 4 on the drive shaft, wherein the sealing ring has been pressed together by the chamfer and has reached its end position.

FIGS. 8*a* to 8*c* show the method for mounting the planetary gearbox or the sun gear 3 of the planetary gearbox on the drive shaft 2. Here, the sun gear 3 is pushed onto the drive shaft 2 in the axial direction.

According to FIG. 8*a*, the sealing ring 9 is first placed inside the groove 22 formed in the extension portion 212 of the outer spline toothing 21. In the following, the sun gear is pushed onto the drive shaft 2 in the axial direction according to FIG. 8*b*. Here, for one thing, the outer spline toothing 21 of the drive shaft 2 comes into engagement with the inner spline toothing 31 of the sun gear 3. For another thing, if an axial displacement of the sun gear 3 occurs, the sealing ring 9 is moved to the chamfer 35 formed at the axially rear end face 34 radially inside. Here, the chamfer 35 is aligned and dimensioned in such a manner, i.e. it has such a radial height and beveling, that the sealing ring 9 is pressed together in the radial direction by the shape of the chamfer 35 if a further displacement of the sun gear 3 occurs.

FIG. 8*c* shows the sealing ring 9 in the finished mounted position in which it abuts with tension at the inner circumferential surface 32 of the sun gear 3.

Thanks to the reciprocal effects of the chamfer 35 and the elastic sealing ring 9 that is formed with a variable diameter, the sealing ring can be mounted "blindly", i.e. without the option of optically observing it during mounting, in a safe manner and without any danger of damage. At the same time, due to the fact that the sealing ring is embodied so as to be springing outwards, the sealing ring is placed with force at the opposite surface 32 of the sun gear 3, so that a high-quality and reliable sealing function is realized.

FIG. 9 shows an exemplary embodiment for introducing oil into the toothing area 71 of the spline shaft connection. The basic structure corresponds to that of FIGS. 3 and 4, which are accordingly referred to. What is additionally shown in FIG. 9 is an oil level 8 that is embodied with a height h between the axially frontal sealing ring 33 and the axially rear sealing ring 9 in the toothing area 71. Since during operation the oil is subjected to a radially outwards acting force as a result of the centrifugal force, the oil level 8 is embodied adjacent to the sun gear 3.

The oil level 8 may not drop and therefore new oil has to be supplied continuously or at defined points in time. This is realized through an oil jet 52 that is sprayed onto a radial gap 55 formed below the sealing ring 9 from the back, i.e. counter to the axial direction, through an applicator 50. Via this gap 55, the oil is transported into the toothing area 71, as schematically indicated by the shown arrow. This is possible because the outer spline toothing extends continuously from the groove 22 up to the toothing area 71.

The embodiment of the gap 55 is explained more closely by referring to FIG. 10. It shows, in a view from the back from radially outside to radially inside, the sun gear 3, the sealing ring 9, the outer spline toothing in its extension portion 212, and the drive shaft 2. For realizing the gap 55 between the sealing ring 9 of the drive shaft 2, two embodiments can be provided that may be realized either individually or together.

According to the first embodiment, the sealing ring 9 is formed corresponding to FIG. 7, i.e. it forms bow-shaped indentations 96 at its inner circumference. These indentations 96 form or enlarge a gap 551 between the sealing ring 9 and the drive shaft 2 (or between the sealing ring 9 and the tooth root plane of the outer spline toothing 21 of the drive shaft 2). According to the second embodiment, the groove 22 has a smaller radial depth than the outer spline toothing 21 of the drive shaft 3. Accordingly, even if the sealing ring 9 is completely inserted into the groove 22, a gap 552 is present between the radially inner circumferential surface 91 (cf. FIGS. 5*a*, 6*a*, 7) of the sealing ring 9 and the tooth root plane of the outer spline toothing 71.

The gap 55 of FIG. 9 is thus comprised of the gap 551 and/or the gap 552 of FIG. 10.

FIG. 10*a* shows an exemplary embodiment in which the outer spline toothing is formed so as to have a different extension portion 212 than the toothing in the first area 211 (cf. FIGS. 3 and 4). Thus, in the exemplary embodiment of FIG. 10*a*, the outer spline toothing has only three teeth in it extension portion 212 that are distributed in an even manner along the circumference. One of the teeth is shown in FIG. 10*a*. Here, there are still sufficient teeth present for the groove 22 to be defined and for the sealing ring 9 to be axially positioned through the groove 22 in a safe manner.

Here, just like in the exemplary embodiment of FIG. 10, the groove 22 has a smaller radial depth than the outer spline toothing of the drive shaft 3. Accordingly, even if the sealing ring 9 is completely inserted into the groove 22, a gap 552 is present between the radially inner circumferential surface 91 of the sealing ring 9 and the tooth root plane of the outer spline toothing. Alternatively or additionally, it can be provided that the sealing ring 9 has bow-shaped indentations at its inner circumference 91, corresponding to FIG. 7 (not separately shown in FIG. 10*a*).

FIG. 11 shows an alternative exemplary embodiment for introducing oil into the toothing area 71 of the spline shaft connection. In contrast to FIG. 9, an oil jet 53 is supplied from the front by means of an applicator 51, i.e. in the axial direction, for maintaining the oil level 8. Here, the oil jet 53 is supplied via a gap 56 into the toothing area 71 which is formed between the frontal sealing ring 33 that is connected to the sun gear 3 and the drive shaft 2.

In one embodiment of the invention, it is provided that the sealing ring 9 is coupled to the drive shaft 2 in the circumferential direction, so that they have the same rotational speed. An associated first exemplary embodiment is shown in FIGS. 12 and 13, and an associated second exemplary embodiment is shown in FIG. 14.

Accordingly, a pin 27 is connected to the drive shaft 2 that extends in the radial direction, and in doing so passes through an opening 98 that is formed in the sealing ring 9, according to FIGS. 12 and 13. In this manner, for one thing, the sealing ring 9 is accelerated along with an acceleration of the drive shaft and, for another thing, is decelerated along with a deceleration of the drive shaft. In contrast, a rotation of the sealing ring 9 relative to the drive shaft 2 is avoided.

For realizing such a functionality, it is provided in FIG. 14 that the sealing ring 9 forms an axial extension 97 that engages in the area 212 of the outer spline toothing 21, whereby the sealing ring 9 is coupled to the drive shaft 2 in the circumferential direction and with respect to its rotational movement.

The present invention is not limited in its embodiment to the above-described exemplary embodiments. For example, the shown embodiment of the sealing element 9 is to be understood merely as an example.

Further, it is to be understood that the features of the individual described exemplary embodiments of the invention can be combined with each other in different combinations. As far as ranges are defined, they comprise all values within that range, as well as all partial ranges that fall within a range.

The invention claimed is:

1. A geared turbofan engine, comprising:
    a fan stage,
    a fan shaft via which the fan stage is driven,
    a turbine shaft, and
    a planetary gearbox that couples the fan shaft and the turbine shaft to each other, wherein
    the planetary gearbox has a sun gear that rotates about a rotational axis of the geared turbofan engine and is driven by the turbine shaft, wherein the rotational axis defines an axial direction of the geared turbofan engine,
    the turbine shaft forms an outer spline toothing and the sun gear forms an inner spline toothing, and the outer spline toothing and the inner spline toothing form a spline shaft connection of the turbine shaft and the sun gear,
    the spline shaft connection has a toothing area that is lubricated with oil, and
    sealing means are provided, sealing off the oil in the toothing area against axial leaking,
    wherein
    the sealing means have an elastic sealing ring that has variable diameter and is springing outwards, and that is arranged inside a groove that extends in the circumferential direction of the turbine shaft, wherein, with its radially outer circumferential surface, the sealing ring abuts at an inner circumferential surface of the sun gear.

2. The geared turbofan engine according to claim 1, wherein the sealing ring has two ends that adjoin each other, and in doing so overlap with each other, wherein the degree of overlapping determines the diameter of the sealing ring.

3. The geared turbofan engine according to claim 2, wherein the ends of the sealing ring overlap with each other in a freely movable manner, and in doing so form respectively one extension with an axial abutment surface, wherein the extensions abut each other at their axial abutment surfaces.

4. The geared turbofan engine according to claim 2, wherein the ends of the sealing ring overlap with each other, and in doing so respectively form an extension with an axial abutment surface and an axial projection, wherein the degree of overlapping of the ends has a maximum and a minimum, and wherein the minimum degree of overlapping is defined by the axial projections of the two extensions that come into engagement with each other at the minimum degree of overlapping.

5. The geared turbofan engine according to claim 1, wherein the sealing ring and/or the groove are formed in such a manner that oil can be introduced into the toothing area through a radial gap below the sealing ring.

6. The geared turbofan engine according to claim 1, wherein, at its radially inner circumferential surface, the sealing ring has concave indentations that extend in the radial direction.

7. The geared turbofan engine according to claim 6, wherein the indentations are formed in a bow-shaped manner and are distributed in an even manner across the inner circumference of the sealing ring.

8. The geared turbofan engine according to claim 1, wherein the groove is formed in an extension portion of the outer spline toothing of the turbine shaft that extends in the axial direction to beyond the toothing area.

9. The geared turbofan engine according to claim 8, wherein the groove that is formed inside the extension portion and inside of which the sealing ring is arranged has a smaller radial depth than the outer spline toothing of the drive shaft.

10. The geared turbofan engine according to claim 1, wherein, in addition to the sealing ring, the sealing means that seal off the oil in the toothing area against axial leaking have a further sealing element that is arranged or formed axially opposite the sealing ring on the axially frontal side of the toothing area.

11. The geared turbofan engine according to claim 10, wherein the further sealing element is formed by a further sealing ring that is formed in one piece with the sun gear or is attached at the same, wherein the further sealing ring is arranged and formed in such a manner that it forms a gap to the turbine shaft through which oil can be introduced in the axial direction into the toothing area.

12. The geared turbofan engine according to claim 1, wherein a means is provided that acts together with the sealing ring and that couples the rotation of the sealing ring with the rotation of the turbine shaft.

13. The geared turbofan engine according to claim 12, wherein the means is formed by a pin that is connected to the turbine shaft and extends in the radial direction, and that passes through a corresponding opening inside the sealing ring, or that the means is formed by an axial extension of the sealing ring that engages with the outer spline toothing of the turbine shaft.

14. The geared turbofan engine according to claim 1, wherein the sealing ring is made of steel, of polytetrafluorethylene, or of polyamide-imide.

15. The geared turbofan engine according to claim 1, wherein the sun gear has an axially rear, radially extending end face, and forms a chamfer at the axially rear end face radially inside, with the chamfer being oriented and dimensioned in such a manner that, when the sun gear is pushed onto the turbine shaft for mounting purposes, the sealing ring comes to rest against the chamfer of the sun gear, the sealing ring is pressed together in the radial direction by the shape of the chamfer if the sun gear is further axially displaced, and finally abuts the inner circumferential surface of the sun gear under tension with its radially outer circumferential surface.

16. The geared turbofan engine according to claim 1, wherein the geared turbofan engine further comprises:
    a plurality of planetary wheels that are driven by the sun gear,
    a ring gear with which the plurality of planetary wheels is in engagement, and
    a plurality of planetary pins, wherein respectively one planetary pin is arranged in a planetary wheel, and the planetary pin and the planetary wheel form a lubricated bearing, wherein the planetary pins are coupled to a torque carrier, and the torque carrier is coupled to the fan shaft.

17. A method for mounting a planetary gearbox on a turbine shaft for producing a geared turbofan engine according to claim 1, wherein the sun gear of the planetary gearbox is pushed onto the turbine shaft in the axial direction, characterized by the steps of:

placing the sealing ring inside the groove of the turbine shaft, pushing the sun gear onto the turbine shaft in the axial direction, wherein the sun gear has a chamfer at its axially rear end face, with the chamfer being oriented and dimensioned in such a manner that, if an axial displacement of the sun gear occurs, the sealing ring comes to rest against the chamfer of the sun gear, and the sealing ring is pressed together in the radial direction by the shape of the chamfer if a further displacement of the sun gear occurs, and in the finished mounted position, the sealing ring abuts with tension at the inner circumferential surface of the sun gear adjacent to the toothing area.

18. A spline arrangement, comprising a drive shaft that has an outer spline toothing, a drive element that has an inner spline toothing and is driven by the drive shaft, wherein the outer spline toothing and the inner spline toothing form a spline shaft connection of drive shaft and drive element, the spline shaft connection has a toothing area that is lubricated with oil, and sealing means are provided, sealing off the oil in the toothing area against any axial leaking, wherein the sealing means have an elastic sealing ring that has a variable diameter and is springing outwards, and that abuts an inner circumferential surface of the drive element with its radially outer circumferential surface.

19. The spline arrangement according to claim 18, wherein the outer spline toothing of the drive shaft extends up to axially beyond the toothing area, and in doing so forms an extension portion of the outer spline toothing axially adjacent to the toothing area, the sealing ring is arranged inside a groove that extends in the circumferential direction of the drive shaft, and the groove is formed in the extension portion in the outer spline toothing of the drive shaft.

20. The spline arrangement according to claim 19, wherein the sealing ring has two ends that adjoin each other, and in doing so overlap with each other, wherein the degree of overlapping determines the diameter of the sealing ring, and that the sealing ring and/or the groove are formed in such a manner that oil can be introduced into the toothing area through a radial gap below the sealing ring.

* * * * *